(12) United States Patent
Pos

(10) Patent No.: US 9,610,870 B2
(45) Date of Patent: Apr. 4, 2017

(54) CHILD SEAT

(75) Inventor: Martin Pos, Bayreuth (DE)

(73) Assignee: CYBEX INDUSTRIAL LTD., Hong Kong (HK)

( * ) Notice: Subject to any disclaimer, the term of this patent is extended or adjusted under 35 U.S.C. 154(b) by 358 days.

(21) Appl. No.: 13/822,427

(22) PCT Filed: Sep. 14, 2010

(86) PCT No.: PCT/EP2010/063451
§ 371 (c)(1),
(2), (4) Date: May 21, 2013

(87) PCT Pub. No.: WO2012/034585
PCT Pub. Date: Mar. 22, 2012

(65) Prior Publication Data
US 2013/0307300 A1 Nov. 21, 2013

(51) Int. Cl.
*B60N 2/28* (2006.01)

(52) U.S. Cl.
CPC ......... *B60N 2/2887* (2013.01); *B60N 2/2812* (2013.01); *B60N 2/2824* (2013.01); *B60N 2/2839* (2013.01); *B60N 2/2869* (2013.01); *B60N 2/2875* (2013.01); *B60N 2/2884* (2013.01)

(58) Field of Classification Search
USPC .... 297/216.16, 216.14, 216.19, 216.11, 253, 297/256.16
See application file for complete search history.

(56) References Cited

U.S. PATENT DOCUMENTS

| | | | | |
|---|---|---|---|---|
| 2,664,140 | A | * | 12/1953 | Kindelberger .............. 297/250.1 |
| 3,922,035 | A | * | 11/1975 | Wener ....................... 297/256.13 |
| 4,936,629 | A | * | 6/1990 | Young ....................... 297/256.12 |

(Continued)

FOREIGN PATENT DOCUMENTS

| | | |
|---|---|---|
| EP | 2 263 911 A1 | 12/2010 |
| GB | 2 424 921 A | 10/2006 |

(Continued)

OTHER PUBLICATIONS

International Search Report for PCT/EP2010/063451, mailed May 20, 2011; ISA/EP.

*Primary Examiner* — David E Allred
(74) *Attorney, Agent, or Firm* — Harness, Dickey & Pierce, P.L.C.

(57) ABSTRACT

A child's seat (1), in particular a child's seat (1) for use in an automobile (2), is described. The child's seat comprising: a seat portion (3) which is connectable with, or connected to, or is integrally formed with a base piece (10). The base piece (10) or seat portion (3) when the seat portion (3) and base piece (10) are integrally formed, being provided with one or more Isofix connectors (11) for direct attachment to complementary connector components (12) in the automobile (2). The seat (1) further comprising at least one belt (30, 50) which is provided in the seat portion (3) and which is either in direct connection with the Isofix connectors (11) when the base piece (10) and seat portion (3) are integrally formed, or is in direct connection with the base piece (10) after engagement of the seat portion (3) and the base piece (10), so as to provide a direct attachment path through to the Isofix connectors (11).

16 Claims, 8 Drawing Sheets

(56) References Cited

U.S. PATENT DOCUMENTS

| | | | | |
|---|---|---|---|---|
| 4,971,392 A * | 11/1990 | Young | | 297/256.12 |
| 5,669,663 A * | 9/1997 | Feuerherdt | | 297/253 |
| 5,899,534 A * | 5/1999 | Gray | | B60N 2/3084 |
| | | | | 297/238 |
| 5,908,223 A * | 6/1999 | Miller | | A44B 11/2549 |
| | | | | 297/467 |
| 6,000,753 A * | 12/1999 | Cone, II | | 297/256.16 |
| 6,260,920 B1 * | 7/2001 | Tolfsen | | 297/256.16 |
| 6,457,774 B2 * | 10/2002 | Baloga | | B60N 2/286 |
| | | | | 297/250.1 |
| 6,513,870 B1 * | 2/2003 | Takizawa | | 297/216.11 |
| 6,694,577 B2 * | 2/2004 | Di Perrero | | A44B 11/2511 |
| | | | | 24/633 |
| 7,073,859 B1 | 7/2006 | Wilson | | |
| 7,357,451 B2 * | 4/2008 | Bendure et al. | | 297/256.12 |
| 7,520,036 B1 * | 4/2009 | Baldwin | | A44B 11/2523 |
| | | | | 24/635 |
| 7,559,606 B2 * | 7/2009 | Hei et al. | | 297/256.12 |
| 7,722,118 B2 * | 5/2010 | Bapst et al. | | 297/256.12 |
| 8,419,129 B2 * | 4/2013 | Inoue et al. | | 297/256.13 |
| 8,459,739 B2 * | 6/2013 | Tamanouchi et al. | | 297/256.16 |
| 8,632,124 B2 * | 1/2014 | Clement et al. | | 297/216.11 |
| 8,672,403 B2 * | 3/2014 | Mendis et al. | | 297/216.11 |
| 2001/0004162 A1 * | 6/2001 | Yamazaki | | B60N 2/2821 |
| | | | | 297/256.12 |
| 2003/0030311 A1 * | 2/2003 | Woodard | | B60N 2/2806 |
| | | | | 297/250.1 |
| 2003/0209926 A1 * | 11/2003 | Nakagawa | | B60N 2/2821 |
| | | | | 297/256.16 |
| 2004/0084939 A1 * | 5/2004 | Boyle | | 297/253 |
| 2005/0062321 A1 * | 3/2005 | Maier et al. | | 297/250.1 |
| 2007/0001495 A1 * | 1/2007 | Boyle | | B60N 2/2806 |
| | | | | 297/253 |
| 2009/0183348 A1 * | 7/2009 | Walton | | A44B 11/2511 |
| | | | | 24/633 |
| 2009/0184549 A1 * | 7/2009 | Kassai et al. | | 297/256.1 |
| 2010/0052384 A1 | 3/2010 | Yang | | |
| 2010/0090509 A1 | 4/2010 | Balensiefer, II et al. | | |
| 2011/0089728 A1 * | 4/2011 | Wuerstl | | 297/216.11 |
| 2011/0227376 A1 * | 9/2011 | Franck et al. | | 297/216.11 |
| 2014/0084650 A1 * | 3/2014 | Rabeony | | B60N 2/286 |
| | | | | 297/256.12 |

FOREIGN PATENT DOCUMENTS

| | | |
|---|---|---|
| KR | 2005 0018617 A | 2/2005 |
| WO | WO-2005/012032 A1 | 2/2005 |

* cited by examiner

26

CHILD SEAT

CROSS-REFERENCE TO RELATED APPLICATIONS

This application is a 371 U.S. National Stage of International Application No. PCT/EP2010/063451, filed on Sep. 14, 2010, the contents of which application is hereby incorporated by reference in its entirety as if fully set forth herein.

BACKGROUND TO THE INVENTION

In order to improve child safety when taking children in automobiles, it is advisable to provide a child seat when the child being carried is too small to use one of the normal three point harnesses or seatbelts. Typical child seats are provided as separate seats which can be attached to the automobile and which are appropriately sized and shaped to hold small children in a safe manner. Typical child seats come in a variety of designs, some of which are intended for fixing to the backseat or the front seat of an automobile, or indeed both. Further, designs for child seats include forward facing and rear facing designs, these direction being determined by the forward and backward directions in the automobile.

Several designs of child seats include a three or four point harness which is used to hold the baby or child within the seat. Other designs also include a lap cushion or restraint which is positioned over the lap or stomach of the child when in the seat, so as to hold the child within the seat in a safe manner and to support the child should an accident occur. It is typical for these lap cushion or restraints to interface with the standard seatbelts provided within the automobile, with the lap restraint being provided with a slot, or the like, such that the seatbelt in the automobile can be positioned in front of the lap restraint and thus hold this in place. This system improves the safety to the child, as both the child seat harness and the seatbelt attached to the car are used to secure the child should an accident occur.

Current child seat designs are typically provided in one or other of the forward or rearward facing orientations. That is, most child seats are provided with either a front or rearward facing design, thus limiting the choice for the child, and thus restricting the possibility of allowing the child to face the front or the rear of the car as the child may desire. Further, integrating the child seat with the seatbelt positioned in the automobile, either with or without the means of the lap restraint or cushion, further hinders the possibility of adjusting the orientation and location of the child seat. Finally, many child seats are in a fixed orientation, and cannot be tipped forward or backward. This reduction in the tipping options of the child seat is further hampered by utilising the seatbelt of the automobile to fix the child seat within the automobile.

Additionally, there are real problems with child seat misuse, where the child seat is not properly connected to the car, or is not used exactly as the seat was intended. This is particularly a problem when the child seat is supposed to be connected to the car by means of the inbuilt car seat belts. Additionally, if the child seat has several possible orientations or different fixing possibilities, the possibility of user error greatly increases. Unfortunately, the safety performance of a child seat is dramatically impaired when it is not correctly fitted or properly constructed.

SUMMARY OF THE INVENTION

The present disclosure has been conceived to address the abovementioned problems. In particular, it is an aim to provide a child seat which cannot be misused or incorrectly connected to the automobile. Also a child seat which may be rotated and possibly tilted in a straightforward and controllable manner, and which does not specifically require the three point or two point harness or seatbelt currently fitted to the automobile for holding the child seat in position. The present invention provides a child's seat in accordance with independent claim 1. Further preferred embodiments are given in the dependent claims.

The claimed invention can be better understood in view of the embodiments described hereinafter. In general, the described embodiments describe preferred embodiments of the invention. The attentive reader will note, however, that some aspects of the described embodiments extend beyond the scope of the claims. To the respect that the described embodiments indeed extend beyond the scope of the claims, the described embodiments are to be considered supplementary background information and do not constitute definitions of the invention per se. This also holds for the subsequent "Brief Description of the Drawings" as well as the "Detailed Description."

The child seat of the present disclosure is one which preferably interacts with an automobile, to provide a secure setting for a child whilst also allowing the seat to be freely rotated to allow forward or rearward orientation of the seat. In particular, the child seat is provided with a base portion or piece which has appropriate Isofix connectors for attachment to the automobile. Isofix connectors are well known in the field of safety connections with automobiles, and provide a specific tether point to the automobile to provide appropriately strong and safe connections to the frame or chassis of the automobile. Such Isofix connectors are also incorporated in new cars, or can readily be added to new cars to provide safe rigid connections with the automobile.

The child seat of the present disclosure is intended to interface through such an Isofix connector arrangement, and is provided with the appropriate connector modules in the base piece. The base piece is thus located and designed to provide the base of the child seat, and will sit or be positioned on the seat of the automobile to which the child seat is to be attached. When the base piece is positioned on the seat the Isofix connectors can be appropriately connected to those positioned in the automobile, thus firmly and securely attaching the base piece to the automobile.

The child seat comprises a seat portion and this seat portion is connected to, connectible with, or formed integrally with the base piece described above. In this manner, the seat portion is directly connected to the automobile via the Isofix connectors either via the base portion or indeed directly. Additionally, the child seat can be provided with a seatbelt or belt within the seat portion. The seatbelt or belt may be in direct connection with the base piece, such that the belt is in essence directly connected to the automobile by means of the Isofix connectors. The advantage of using the Isofix connectors is that the belt within the child seat is connected to the automobile without utilising a system which has any give or take, for example by using one of the inbuilt two or three point harnesses of the automobile. Should the child seat be provided with a separate base piece to which the seat portion is attachable or attached, the belt is connected in such a way that this connects directly to the base piece, perhaps by some heavy duty connection means, such that the belt in the seat portion is still provided with a direct connection path through to the Isofix connector.

It is possible that the child seat is constructed to be a rearward facing child seat. When the child seat is a rearward facing child seat, the Isofix connectors are provided either in the seat portion or base piece toward the front of the seat. The front of the seat would be the portion of the child seat which lies next to the legs and feet of the child, when the child is within the seat. In this situation the belt could be provided as a first belt, preferably provided as a seatbelt loop. The seatbelt loop may be connected to the base piece or connected therewith at the front of the child seat, either when the base piece is integral with the seat portion or separate there-from. The belt loop can then extend around the upper part of the seat making up the seat portion, so as to form a loop which passes around the back of the headrest of the seat portion and the child's back and back to the connection point with the Isofix connectors. In this way, if the automobile is in an accident and the head area of the seat portion is under extreme load, the seatbelt or belt loop will absorb the majority of the forces and stop the seat from deforming as a result of the weight of the child therein. Further, the majority of the forces will be passed directly through the child seat to the Isofix connectors and to the automobile.

If the child seat is formed as a forward facing child seat, Isofix connectors are provided at the rear of the child's seat, which is the side of the seat next to the back of the child when the child is sitting within the seat. The belt can then be provided as a belt which is again in direct connection with the Isofix connectors, as described above, but which has either the sockets or plug portions of a normal seatbelt connector at the ends of the belt. The specific structure is thus provided to allow for a lap connector, to be described in more detail below, which interfaces with the plug and/or socket of the seatbelt connector provided at either end of this seatbelt or belt, and thus provides a direct connection path from this lap restraint which is positioned in front of the child through to the body of the car via the Isofix connector.

It is also possible to provide the child seat with both front and rear Isofix connectors and both of the above described belt systems. Such a child seat would be connectible to the automobile in a straightforward manner, via the Isofix connectors, and thus allow for the child to be positioned in a forward or rearward facing orientation.

Attached or attachable to the base piece is a rotatable element. This rotatable element interfaces with the base piece in a rotatable manner, such that the rotatable element can be rotationally aligned with regard to the base piece as necessary. Attached or attachable to the rotatable element, or formed integral with the rotatable element is a seat portion. The seat portion provides the seat into which the child will be placed for carrying during transport. The seat portion is interfaced or attachable with the rotational element or piece only, and thus can be freely rotated with respect to the base piece. That is, the base piece is affixed to the car in a known orientation, and the seat by means of the rotational or rotatable element is rotatably held thereon.

A first seatbelt may be provided within the rotatable child seat. This first seatbelt is attached or attachable to the rotatable element of the child seat. This seatbelt is thus appropriately connected through the rotatable element to the base portion and then through to the Isofix connectors. That is, the first seatbelt is provided with a direct connection path through to the Isofix connectors, and in thus appropriately and safely connected with the automobile through such Isofix connectors. In this manner, the first seatbelt is appropriately provided and structured to give a safe connection through to the automobile.

It is preferable if the first seatbelt is provided with the plug or socket portions of a seatbelt connector. In particular, each end of the seatbelt may be so provided with the plug or socket of a seatbelt connector, and indeed the ends may be provided with different ones of the socket or plug. In such a design, the first seatbelt is located and held within the seat section of the child seat, wherein the connector portions are accessible to the outside of the child seat and can readily be accessed by a user of the child seat.

The child seat may also be provided with a lap cushion, front cushion or restraint for securing the child within the seat portion. In particular, the front or lap cushion is intended to bridge from one side of the seat portion to the other, so as to securely hold the child within the seat. In order to interface the lap cushion with the seat portion, it is preferable to provide this with the appropriate interfacing socket or plug of a seatbelt connector. In such a manner, it is clear that the child may be positioned within the seat, that the lap restraint or cushion may be positioned over the child, in particular aligning with the child's lap or stomach, and then the lap cushion may be connected to the child seat by means of the connectors thereon connecting with the connectors on the first seatbelt. In this way, it is obvious that the first seatbelt will then be made complete—bridging the gap between each side of the child seat by means of the lap cushion, thus providing an appropriate seatbelt loop around the child. As is further clear, both the first seatbelt and lap cushion are provided with a direct link through to the Isofix connectors, which thus safely connects both elements to the body of the automobile. A crucial element to this design is that the lap cushion is properly attached to the body of the automobile through the child seat in a safe manner. With such a connection it is thus not necessary to use one of the seatbelts or harnesses attached to the automobile, and thus the child seat and lap restraint or cushion may be used without the necessity of using one or more of the automobile's safety harnesses or seatbelts. It is this aspect which aids in the rotational capabilities of the child seat.

It is further preferable to provide the child seat with a secondary seatbelt. Once again, the secondary seatbelt should be connected or connectable with the rotatable element, such that this is provided with a direct connection through the Isofix connectors to the automobile. This second seatbelt is preferably held within the seat portion of the child seat, and is attachable to the rotational element at the front leg portion of the seat portion. The second seatbelt forms a loop from this front connected portion, or connectable portion, round the upper edge of the child seat round to the back head portion of the child seat. As can be seen from this structure, if the child seat is facing rearwardly and a front collision occurs, the upper head portion of the child seat is provided with a direct connection through to the Isofix connectors attached to the automobile. Further, by providing the seatbelt loop connected to the rotatable element, the longitudinal deformation of the child seat in such a crash is contained and reduced, thus meaning that the child seat does not deform and the safety of the child is dramatically improved.

It is further preferable if the first and second seatbelts are connected or connectable together, so as to perform or provide a cradle or appropriate cage of seatbelts around the child when in the seat.

A variety of mechanisms exist for holding the rotational or rotatable element with the base portion. One possibility is to simply provide the base portion with a post or pin which is provided with a larger diameter top. The shank of the post is positioned through an appropriate hole on the rotatable element, thus allowing the rotatable element to rotate with respect to the base piece, but stopping the rotatable element from disengaging the post. That is, the larger diameter top to the post is provided with a larger piece than the extent of the hole in the rotatable element, thus ensuring that when the pieces are connected together the rotatable element can rotate with respect to the base piece, but cannot be disengaged therefrom.

A particularly choice design for the rotational or rotatable element is that of a disk with a central opening for attachment to the base portion, preferably as described above. The central opening may receive the shank of the post, with the opening not allowing the larger diameter head to pass therethrough, such that after engagement of the disk and the post the two are rotationably held together. Further, the disk element may be provided with a second opening, preferably that of a circumferential slot or track toward the edge of the disk element. This circumferential slot or track may extend any number of degrees around the edge of the disk element, with the possibility of 180° or 360° being desirable. The circumferential slot or track is intended to interact with a secondary fixing means of the base element, such that the slot allows the rotational or rotatable element, or disk element, to rotate around the central hole or opening whilst the secondary fixing means of the base piece are held within the slot. That is, the disk element rotates around the central post provided on the base piece. The secondary fixing means, which may be one or more in number, are positioned within the circumferential slot and thus allow the rotation of the disk element. Again, a choice design for the secondary fixing means is the same as the post as described above in the centre of the base piece.

It is possible to provide the disk element from a first central disk element and a second ring-shaped or toroidal element. This second ring-shaped element has an inner diameter which is larger than the outer diameter of the central disk portion, and thus when the two are located together into the rotational element, the gap provided between the outer diameter of the inner disk and the inner diameter of the outer ring provides the circumferential slot or track. This two-piece design for the disk element allows the ready production of the slot for incorporating the secondary fixing means of the base piece.

In order to form a single rotational element from the central disk portion and the outer ring element, these may be connected together by means of disk attachment means. These disk attachment means can take any form, the requirement being that they do not overlap with the passage of the secondary attachment means from the base piece as this passes around the circumferential slot or track. Perhaps by means of a U-shaped bracket, which allows enough clearance for the larger diameter head on the secondary fixing means, can the inner disk portion and outer ring portion be fixed together appropriately to provide the disk element. It is a preferable option if this disk attachment means is also the means by which the first and second seatbelts are attached to the rotatable element.

Whilst the disk element may be structured as a flat disk, or a flat central disk with a flat outer ring, it is also possible to provide this by means of a three-dimensionally curved element. That is, the disk element or rotatable portion is provided as a section of the outer surface of a sphere. If the disk element is a two-piece option, the outer ring portion is structured to match the curved profile of the central disk element, thus provided an appropriate curved structure to the whole rotatable element.

It is further possible to provide the rotational child seat such that it may also tip forward and backward in certain rotational orientations. In particular, it is desirable for the child seat to be able to tip forward and backward when in either of the forward or backward orientations with respect to the direction of motion of the car. It is possible for the rotational seat of the present disclosure to tip, as this is provided with the lap restraint connected to the first seatbelt which is directly connected through to the Isofix connector. With this structure, the seatbelt of the automobile does not need to be engaged with the child seat, and thus the child seat is free to both rotate and tip as required.

In order to allow the child seat to tip back and forth, the rotatable element, or disk element, is provided with slots extending from the circumferential slot or track at the edge of the disk element. As will be appreciated, if the circumferential slot is provided with these slot extensions in approximately diametrical opposition to each other, the seat may be tipped back when the secondary attachment means of the base piece can be located within these slots. If the slots on one side of the circumferential slot extend generally away from the centre of the disk element and the slots on the other side extend toward the centre of the disk element, such that the slots are all aligned and parallel with each other, it is clear that when the child seat is rotationally aligned such that these aligned slots are next to the secondary attachment means of the base portion, the chair can be tipped back and forth with the secondary attachment means passing up and down and along the aligned tracks or slots. In order to improve this, the central opening in the central disk-like portion may also be provided with an aligned longitudinal slot, such that in any orientation, that of forward or backward of the child seat, the seat portion may be tipped with respect to the base portion, by sliding the rotational portion such that the secondary attachment means and the central post move up and down the aligned slots in the disk element.

DETAILED DESCRIPTION

Figure 1A:
FIG. 1: Two views showing the rotatable child seat of the present disclosure, View A: forward facing orientation; View B: rearward facing orientation.
Figure 1B:
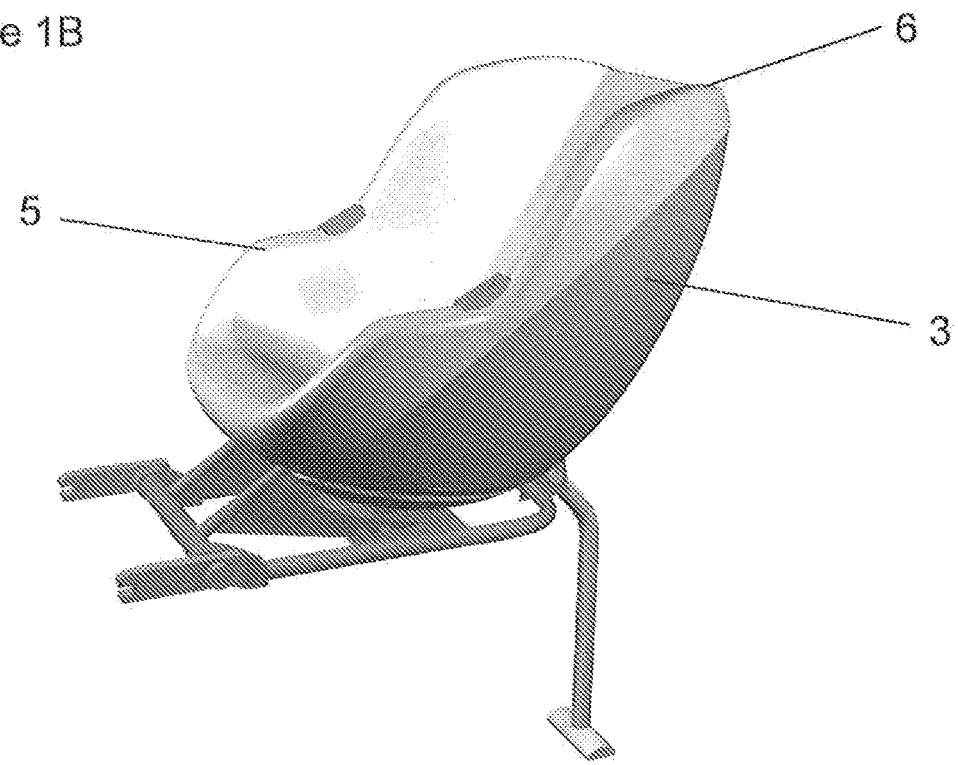

FIG. 1 shows two views of the child seat 1 according to the present disclosure. In FIG. 1A the child seat 1 is positioned in a forward facing orientation, wherein the child using the seat would be facing the normal direction of travel of the automobile 2. In FIG. 1B, the rotatable child seat 1 is in a rearward orientation, such that the child would face the rear of the automobile. As can be appreciated from these Figures, the rotatable child seat 1 is provided with a number of elements making up its construction. In particular, at the lower side of the rotatable child seat 1 is provided a base piece 10. The base piece 10 is intended to rest on the seats of the automobile 2 in which the child seat 1 is to be installed. As can also be seen in all of the Figures, the base piece 10 has a forward oriented resting leg, which is intended to fit in front of the seat of the automobile 2, and rest on the floor of the automobile 2. Obviously, this forward leg will improve the stability of the child seat 1, by providing another point of contact with the automobile 2.

The base piece 10 is specifically provided with Isofix connectors 11, which are part of the well known Isofix system for attaching child seats 1 to automobiles 2. For reference information on the Isofix connector 11 can be found from the International Organisation for Standardisation website under www.iso.org. It will assumed that the Isofix connectors 11 of the present disclosure are not limited to the current design, but will fall within all future designs of the Isofix connector 11 which appropriately fits with fixing points on the automobile 2, in a manner which could be integrated with the present child seat 1.

As will be well known to the skilled person, the Isofix connectors 11 provide a rigid and safe direct connection to the chassis of the automobile 2. The present disclosure is directed to the specific use of the Isofix system for attaching the child seat 1 to the automobile 2. Further, the present system allows for a rotatable, and possibly tiltable, child seat 1 by allowing the connection through the Isofix system, and further without having to rely on the seatbelts attached to the automobile 2. As has been discussed above, it is often desirable that the child seat 1 can be rotated and tipped to improve the comfort for the child using the child seat 1, which can be achieved with the current design.

Figure 2:
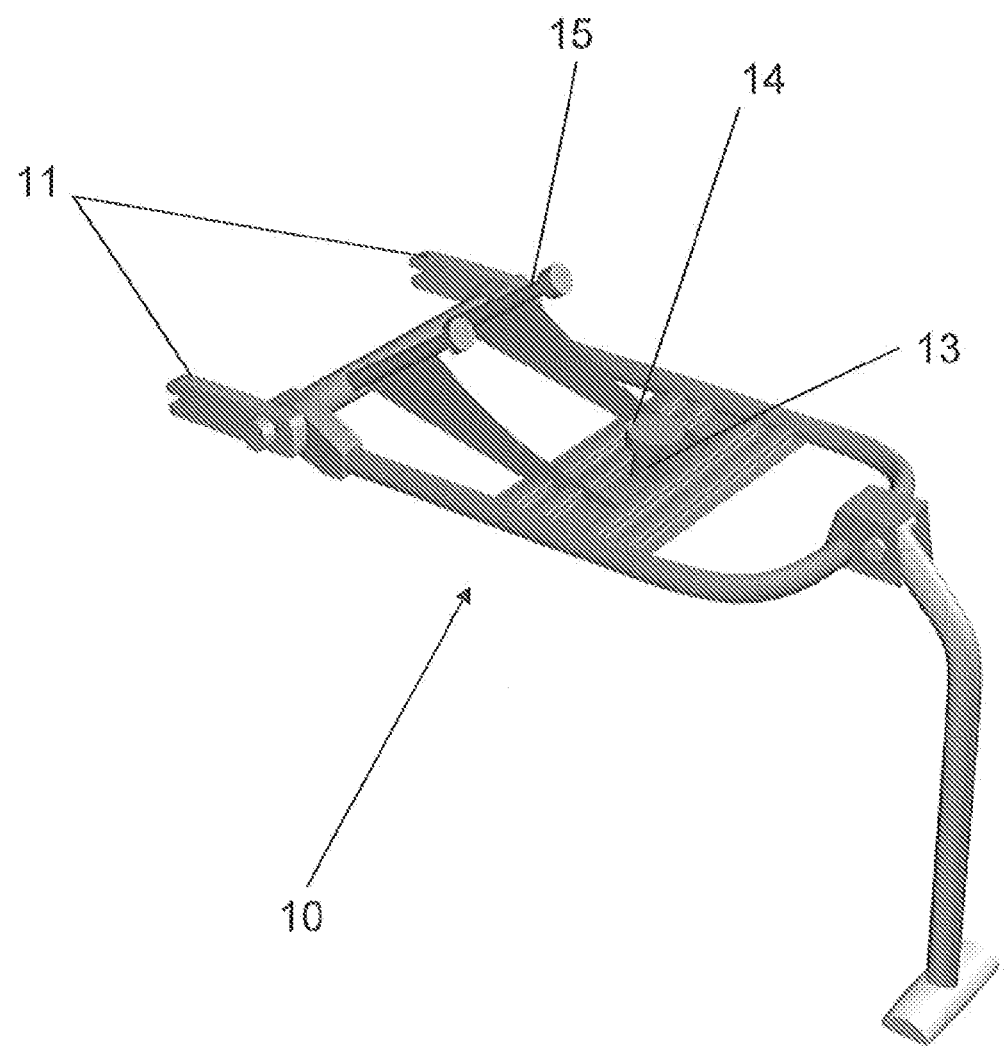
FIG. 2: Base piece of child seat.
Figure 3A:
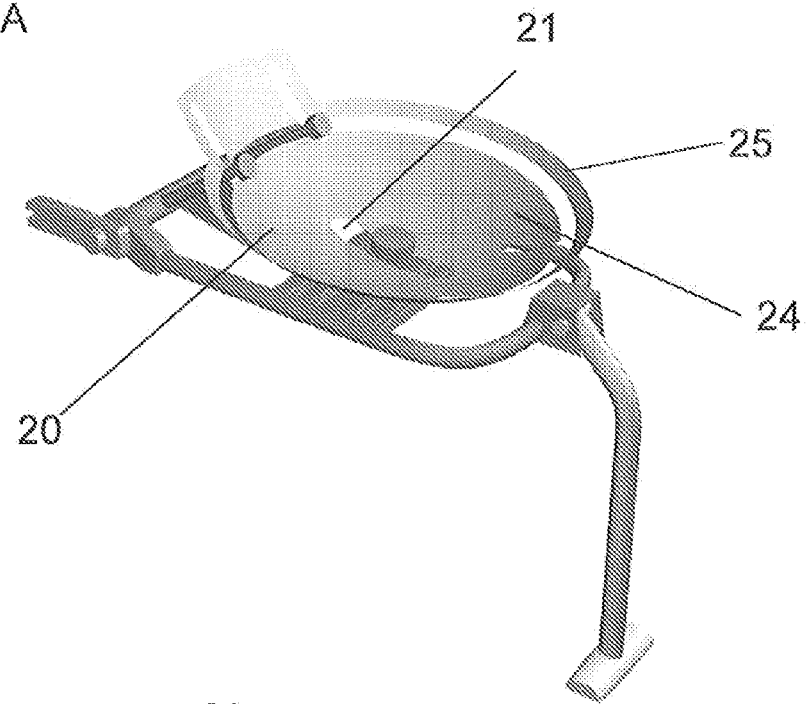
FIG. 3: Base piece and rotatable element for child seat in A: forward facing; B: rearward facing orientation.
Figure 3B:
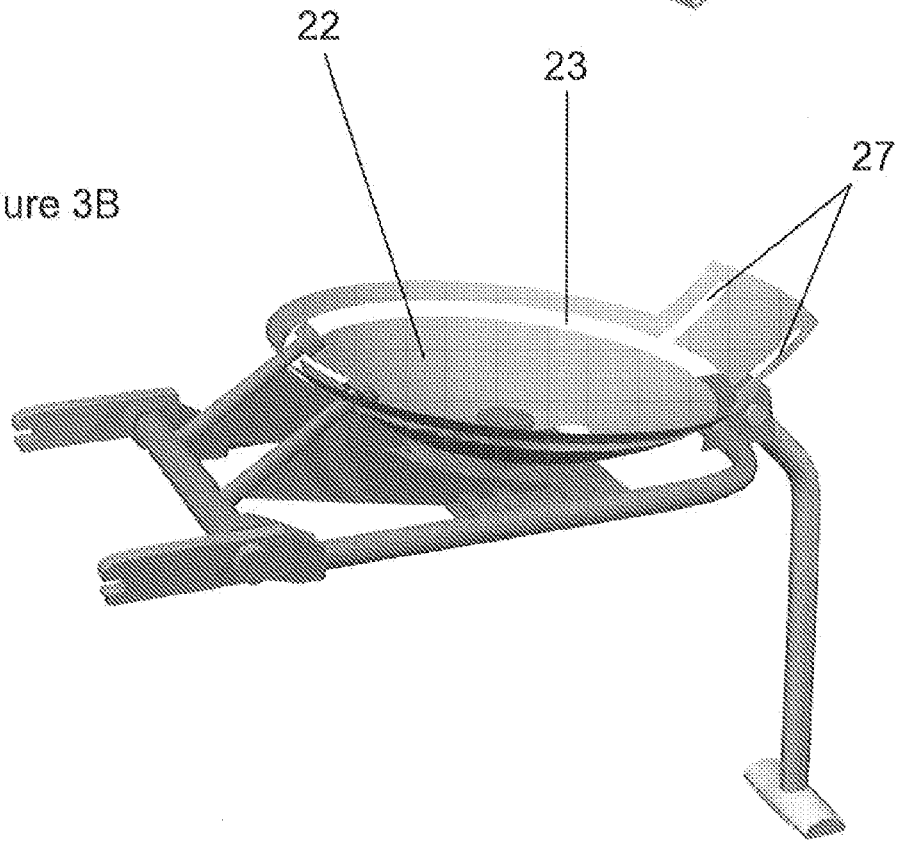
Figure 6:
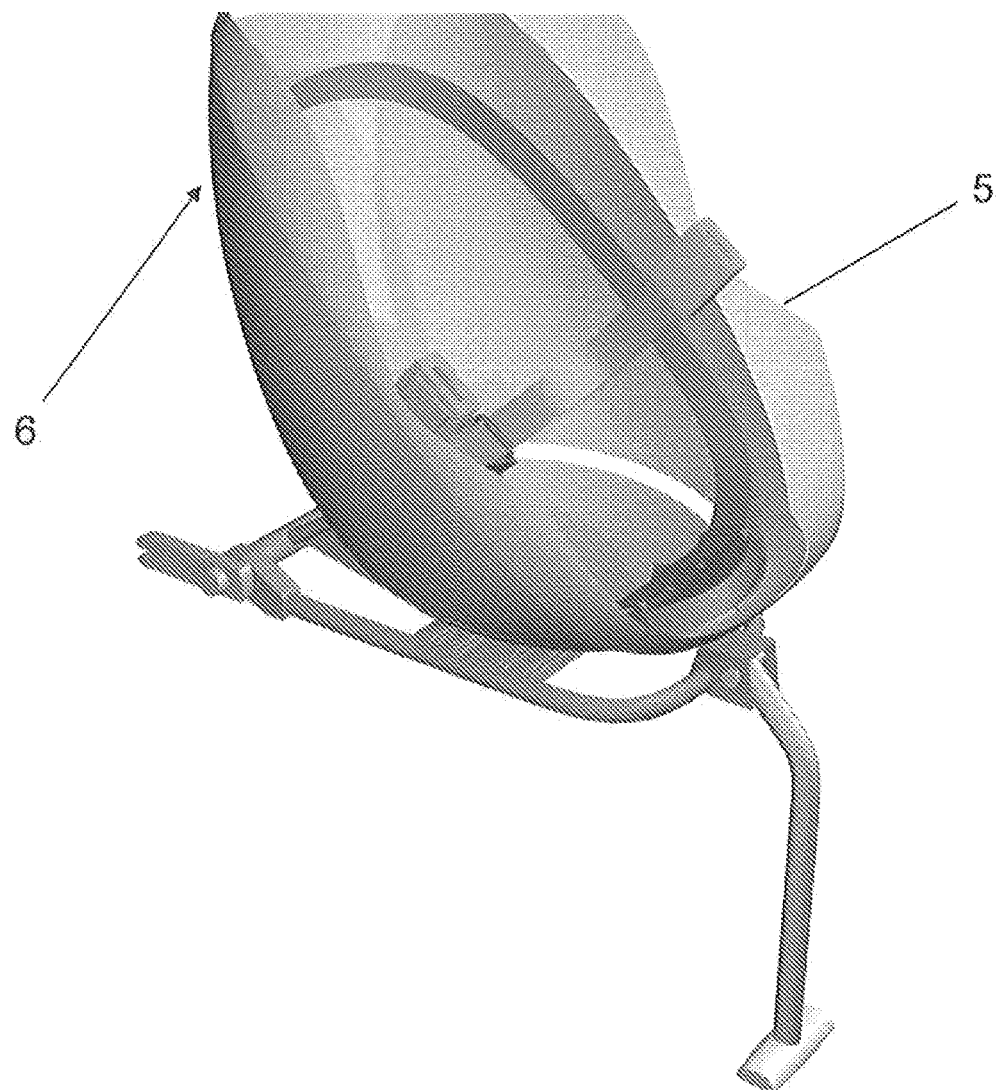
FIG. 6: Belt structure shown in FIG. 5 with overlaying seat portion.
Figure 7:
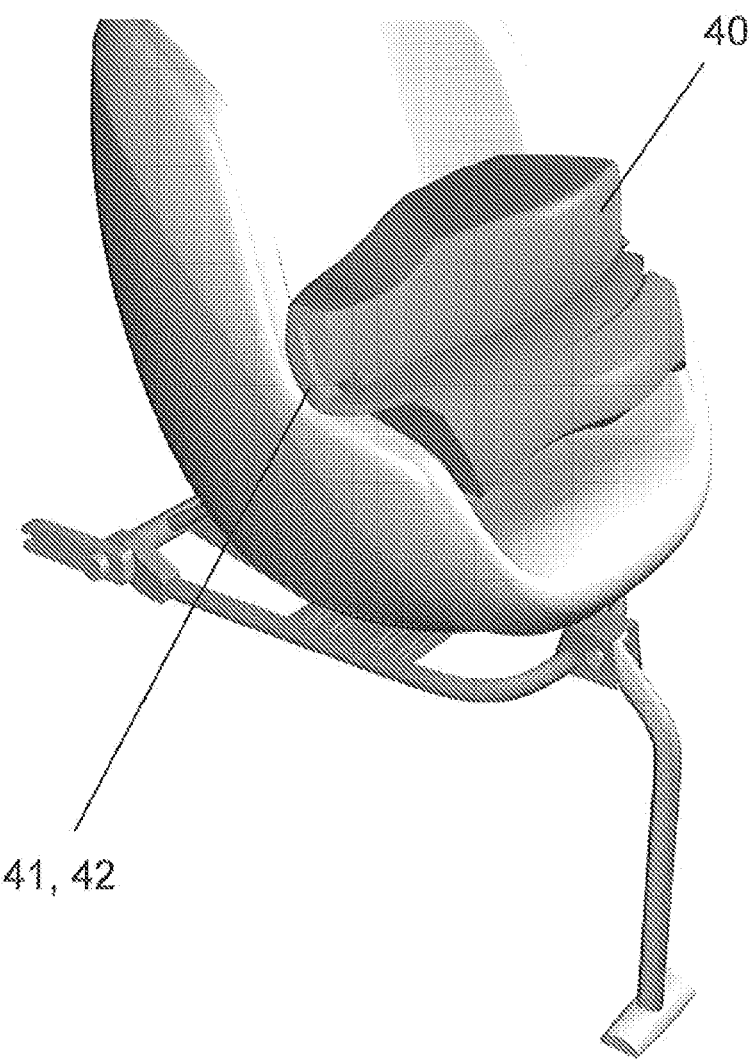
FIG. 7: Seat with lap cushion/restraint.

As can be appreciated from at least FIGS. 1, 6 and 7, the current child seat 1 is provided with the base piece 10 and a seat portion 3. The seat portion 3 interfaces with the base piece 10 in a rotatable manner, so as to allow the child's seat portion 3 to face the forward or rearward directions of the automobile 2. Looking at the base piece 10 in FIG. 2, it is clear that this is provided with a number of connector elements. The base piece 10 interfaces with the seat portion 3 by means of a rotatable element 20. The rotatable element 20 can be seen most clearly in FIGS. 3A and 3B, again in the forward (FIG. 3A) and rearward (FIG. 3B) orientation.

As can be appreciated from FIG. 3, the rotatable element 20 attaches with the base piece 10 in a rotatable manner. The mechanism for connecting these two pieces together is shown as one embodiment in the Figures by means a variety of posts 13 and holes 21 and slots 23. The design shown in FIG. 3, and indeed all of the Figures, shows a system in which the rotatable element 20 is connected with the base piece 10 in multiple locations. Obviously, the more connection points between these two elements, the greater the safety of the resultant child seat 1. It is, however, quite possible to only provide a single central rotatable connection point between the base piece 10 and rotatable element 20.

The central post 13 shown on the base piece 10 can be used to interface with an appropriate hole or opening 21 on the rotatable element 20. If the rotatable element 20 is positioned over the post 13 such that this post 13 is within the hole 21, it is clear that the rotatable element 20 will be held on the base piece 10 in a rotatable manner. Further, advantageously the post 13 is provided with a cap or top piece, which is provided as a larger diameter top 14. The large diameter of the larger diameter top 14 is advantageously larger than the size of the hole 21 in the rotatable element 20. As will be appreciated, once the rotatable element is engaged with the post 13 of the base piece 10 via the hole 21, if the larger diameter top 14 is placed over the post 13, the base piece 10 and rotatable element 20 will be held in engagement, but will still allow rotation.

As was discussed above, to improve the safety of the system, the base piece 10 can be provided with further fixing means. Secondary fixing means 15 are shown in the Figure, with these being provided only at the rear portion of the base piece 10. This is obviously by way of example, and it is possible to also provide further secondary fixing means 15 at the front of the base piece 10 in the region of the forward support leg. In a similar manner to the post 13 and hole 21, if the rotatable element 20 is provided with an opening in the form of the circumferential slot or track 23, the secondary fixing means 15 can engage therewith. Again, if the secondary fixing means 15 are provided with a larger diameter top, this will allow the second opening, that of the circumferential slot or track 23, to integrate with the post section of the secondary fixing means 15, with a larger diameter top again ensuring that these cannot disengage. In this case, rotation of the rotatable element 20 will rotate around the central post 13 and hole 21, wherein the secondary fixing means will move around or along the circumferential slot or track 23. As can be seen in the Figure, the circumferential slot or track 23 is provided generally towards the edge of the rotatable element 20.

The structure shown in the Figures for the rotatable element 20 is that of a disk element 22. Further, the disk element 22 is shown as being a section of an outer surface of a sphere. This is not the only orientation or structure for the disk element 22, and indeed this could be structured as a flat disk. As will be appreciated, the extent of the circumferential slot or track 23 determines the amount of rotation which the rotatable element 20 and seat portion 3 attached thereto can move. It is preferable for the secondary circumferential slot or track 23 to allow rotation of the rotatable element 20 and seat portion 3 of at least 180°. It is further preferential if the seat portion 23 and rotatable element 20 could rotate around 360°. As will be understood, the extent of the circumferential slot or track 23 determines the amount of rotation of the seat portion 3, as the secondary fixing means 15 require this slot or track 23 in order to pass around the rotatable element 20 or disk element 22.

As will be understood from the above, the rotatable element 20 and seat portion 3 are attached in a rotatable manner to the base piece 10. This means that these two elements have an essentially direct connection through to the Isofix connectors of the automobile 2. By means of the Isofix connectors 11 on the base piece 10, the rotatable element 20 and seat portion 3 are connected with the automobile 2 chassis. This means that the child seat is extremely well connected to the automobile 2, but can also rotate with respect to the base portion 10, thus allowing multiple orientations of the child seat portion 3.

It is possible to provide the disk element 22 with a circumferential slot 23 which passes all the way around to allow 360° rotation. In this case, it is clear that the disk element 22 must be formed from two sections. The disk element 22 is thus preferably provided by means of a central disk element 24, which comprises the central aperture or opening 21, and an outer toroidal or ring-shaped piece 25. The gap between the inner diameter of the ring-shaped piece 25 and the outer diameter of the central disk element 24, will generate the circumferential slot or track 23.

Figure 4A:
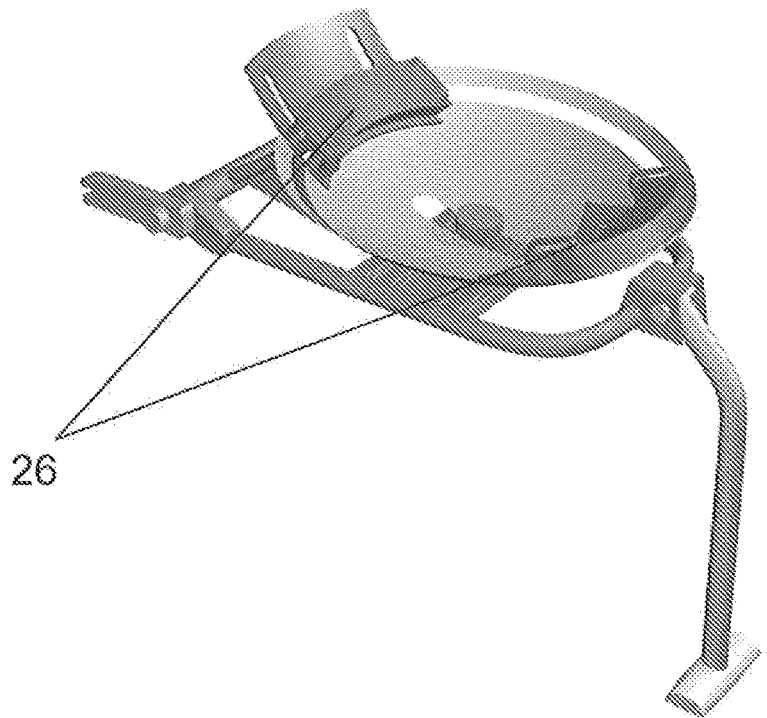
FIG. 4: Base piece and rotatable element with fixing means, again in A: forward; B: rearward orientation.
Figure 4B:
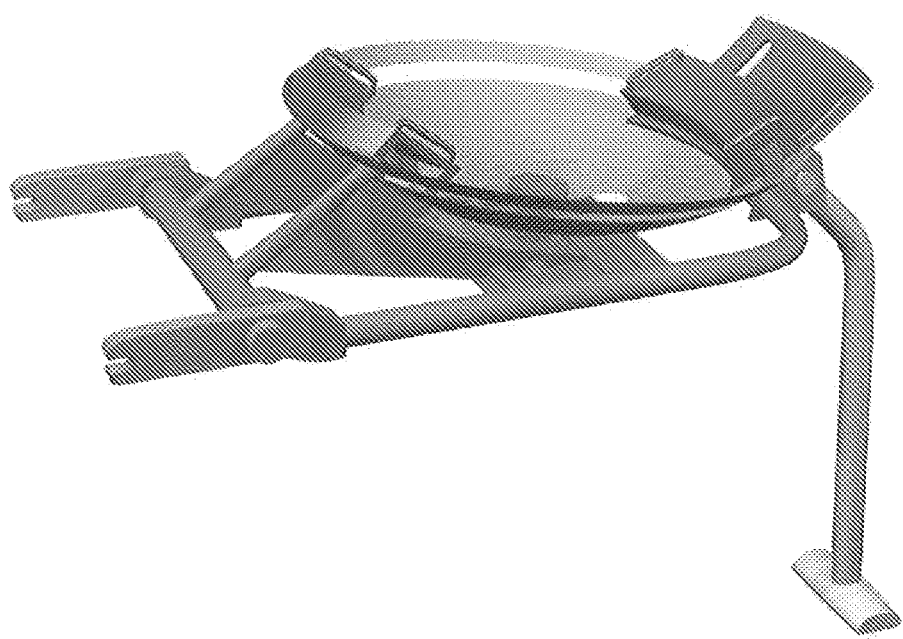

If the disk element 22 is provided by these two separate pieces, it is clear that they must be attached together somehow. FIG. 4 shows the disk attachment means 26 which can be used to attach together the central disk element 24 and the ring-shaped element 25. Obviously it is necessary for the attachment means 26 to be of such a structure that they do not interfere with the upper portion of the secondary fixing means 15. By leaving an appropriate gap it is possible for the secondary fixing means 15 to pass through the circumferential slot and track 23 and pass the disk attachment means 26, thus allowing full 360° rotation of the rotatable element 20. Again, the disk attachment means 26 are appropriately structured to hold together the central disk element 24 and ring-shaped piece 25 so as to form a rigid rotatable element 20, which is appropriately and rigidly connected with the automobile 2 by means of the Isofix connectors 11.

As can be seen in both FIGS. 3 and 4, it is also possible to allow the seat portion 3 to tilt with respect to the base piece 10. By providing aligned slots or tracks 27 extending from the circumferential slot or track 23, the secondary fixing means 15 can pass into these aligned slots and allow the rotatable element 20 to move in a forward or rearward direction. That is, in the orientation shown in FIGS. 3 and 4, the secondary fixing means 15 are aligned with the aligned slots or tracks 27. The aligned slots or tracks 27 are provided as parallel slots in the disk element 22, such that the disk element 22 can be rocked backwards or forwards with the secondary fixing means 15 passing through the aligned slots or tracks 27. In the Figures, the aligned slots 27 extend out of the disk shape of the disk element 22 on a lug or extension. This is obviously by way of design only, and the disk element 22 could be large enough such that its diameter would appropriately accommodate the aligned slots or tracks 27. Additionally, aligned slots or tracks 27 can extend toward the centre of the disk element 22, so as to allow multiple secondary fixing means 15 to move through the appropriate slots or tracks 27. This further allows the seat portion 3 to tip both forward and backward, as desired.

As is further evident, the hole 21 within the central disk element 24 can also be provided as an extended slot which will then further allow the rotatable element 20 to tilt when this is in certain rotational alignment. Preferably, the aligned slots or tracks 27 will allow the seat portion 3 to tilt forward or backward when this in the completely forward facing or rearward facing rotational orientation. Obviously, any other orientation is possible, although in general the most comfortable for the child will be to allow the seat portion 3 to tilt when this is either facing forward or backward.

Figure 5:
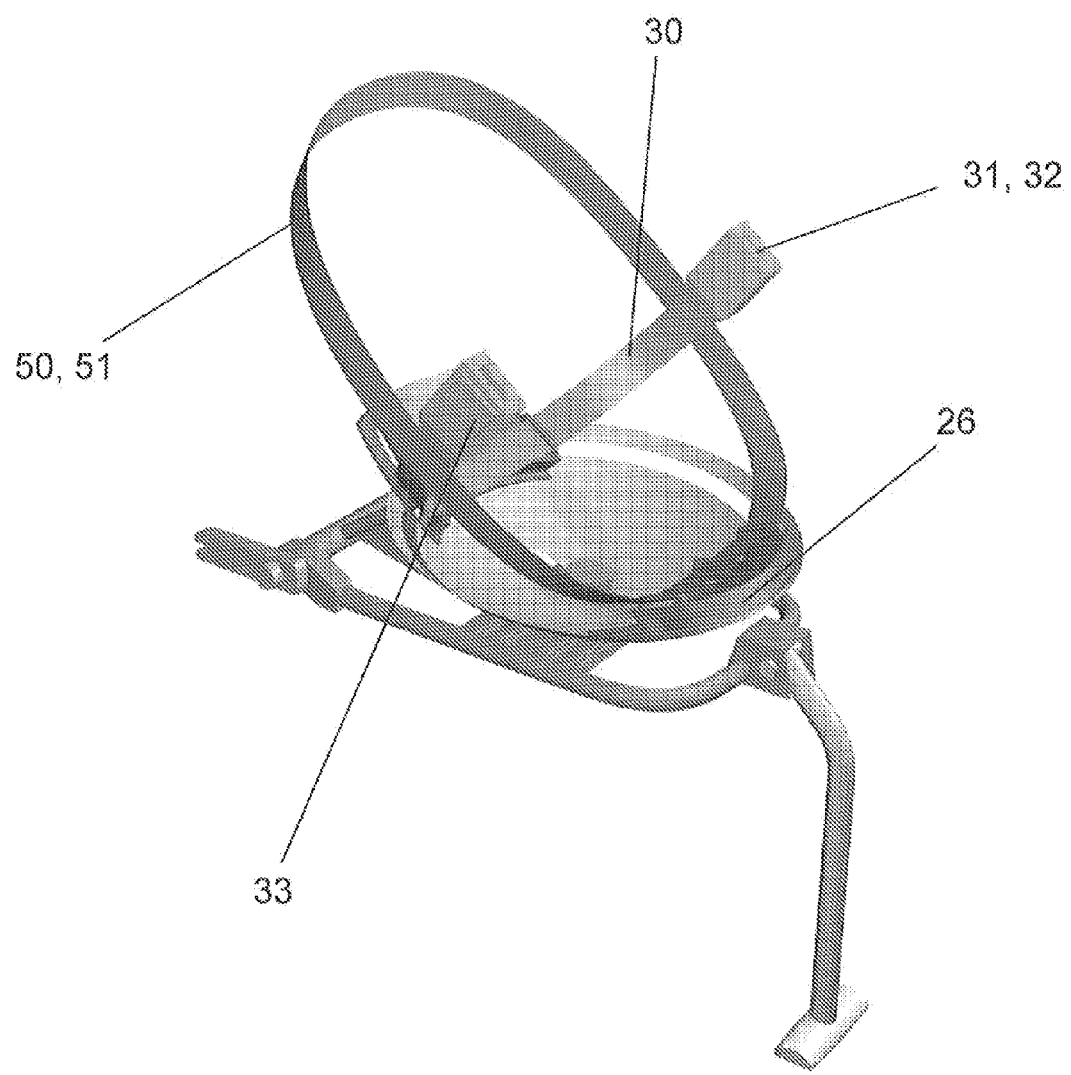
FIG. 5: Belt structure in child seat.

As can be seen in FIGS. 5 and 6, the rotatable child seat 1 is also preferably provided with a number of seatbelts. A first seatbelt 30 is provided which is connected or connectable with the rotatable element 20. As can be understood from the above, direct connection with the rotatable element 20 means that the first seatbelt 30 is provided with a direct connection through to the chassis of the automobile 2. That is, the rotatable element 20 is attached to the base piece 10, which is provided with the Isofix connectors 11 which will connect with the automobile 2. This means that the first seatbelt 30 is a properly connected seatbelt with the chassis of the automobile 2. As can be seen in FIGS. 5 and 6, the first seatbelt 30 is preferably provided with either the socket 31 or plug 32 of a seatbelt connector 33. In the design shown, it is the socket 31 of the seatbelt connector which is attached to both ends of the first seatbelt 30. Obviously, this is only by way of example, and any other combination of these connectors is possible. As will be understood from this, connecting a seatbelt directly into the seatbelt connector 33 of the first seatbelt 30 will mean that this is in direct connection with the chassis of the automobile 2.

As can be seen in FIGS. 6 and 7, the seatbelt connector 33 at the end of the first seatbelt 30 is preferably oriented such that it is accessible from the outside of the child seat 1. That is, as shown in the Figures, the slot of the seatbelt connector socket 31 is provided in an upper armrest portion of the seat portion 3. This means that the user of the child seat 1 can appropriately interface with this socket 31.

As shown in FIG. 7, the child seat 1 can be provided with a front or lap cushion 40. The lap cushion or restraint 40 is used to appropriately hold the child into the seat portion 3 of the child seat 1. Whilst it is possible to provide a harness within the seat portion 3 of the child seat 1, it is also advisable to provide a lap cushion or restraint which covers the waist and lap portion of the child. This greatly increases the safety of the child seat 1, as it stops internal damage to a child in the case of an accident. As will be appreciate from the Figures, the lap cushion 40 needs only be provided with the complimentary seatbelt connectors 41, 42 in order to integrate with the seatbelt connector 33 on the first seatbelt 30. If, for example, the first seatbelt 30 is provided with seatbelt sockets 31, the complimentary seatbelt plug 41 need be provided on the lap cushion 40 so that the lap cushion 40 can be appropriately connected directly to the first seatbelt 30. In so doing, the lap cushion 40 is connected directly to the chassis of the car 2 by means of the base piece 10, Isofix connectors 11 through to the rotatable elements 20 and first seatbelt 30. This system means that the child is very well held in the automobile 2, as the lap cushion 40 is in direct connection with the chassis of the automobile 2.

This system is further advantageous as the lap cushion 40 is directly connected to the child seat 1, and does not require the use of an automobile seatbelt. As is clear, with the direct connection through to the chassis of the automobile 2, the lap cushion 40 does not require that the seatbelt of the automobile 2 be strapped across the child seat 1. In this manner, the child can be provided with the increased safety of the lap cushion 40 whilst also having the increased comfort of a freely rotatable child seat 1 which can also be tipped as described above. Because it is not necessary to connect the child seat 1 by means of the automobile seatbelt, the orientation and position of the seat portion 3 can be adjusted with respect to the chassis of the automobile 2.

As will also be clear in FIGS. 5 and 6, the child seat 1 can be further provided with a secondary seatbelt 50. This secondary seatbelt 50 is preferably provided as a seatbelt loop 51. The seatbelt 50 may be connected or connectable to the front portion of the rotatable element 20, such that the portion of the seat portion 3 by the child's legs is connected to the rotatable element 20. The seatbelt loop 51 passes around the upper side or edge of the seat portion 3 and extends around the back of the head portion of the child's seat portion 3. Once again, it is clear that the second seatbelt 50 is also in direct connection with the chassis of the automobile 2 in the same manner as above for all other elements. The seatbelt loop 51 is advantageous, as if the seat is in a rearward orientation, and a frontal crash should occur, the top portion of the seat portion 3 is connected to the front portion of the rotatable element 20 and thus the chassis of the automobile 2. This stops longitudinal deformation of the seat portion 3, and primarily stops the head portion of the seat portion 3 from deforming too much in such a crash situation. This further improves the safety of the child seat 1.

As can be seen in FIG. 5, it is further possible to attach both the first and second seatbelts 30, 50 to the rotatable element 20 by means of the disk attachment means 26. This is obviously only by way of example, and other fixing means could be provided. Of course, to reduce the parts count of the child seat 1, providing the dual role to the disk attachment means 26 not only ensures that the first and second seatbelts 30, 50 are appropriately attached through to the chassis of the automobile 2, but the child seat 1 is appropriately simplified in construction. It is further possible to provide a connection between the first and second seatbelts 30, 50.

Again, this helps to reduce the possible deformation of the seat portion 3 should a crash or accident occur, as the seatbelts 30, 50 will tend to stop distortion of the seat portion 3 thus improving the safety for the child.

As has been stressed above, the design of the child seat 1 is such that it can be safely attached to the chassis of the automobile 2 and allow both rotation and tipping of the seat for the child. Additionally, the increased safety of the provision of a lap cushion or restraint 40 is available in the child seat 1 without the necessity of using the automobile seatbelt 6. Whilst it is possible that combinations of features have been given in direct terms above, this is meant only as an example. The above disclosure should really be considered a combination of potential features which could make up any rotatable child seat 1, and none of the above should be considered as a limiting feature.

Figure 8:
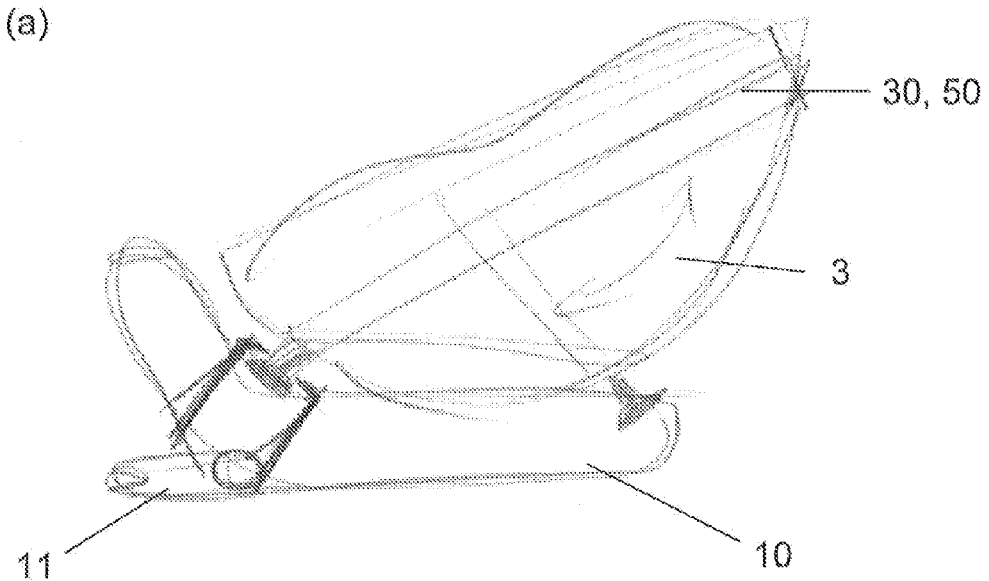
FIG. 8: Seat which is non-rotatable, showing the fixing between the belts and the Isofix connectors.
Figure 8:
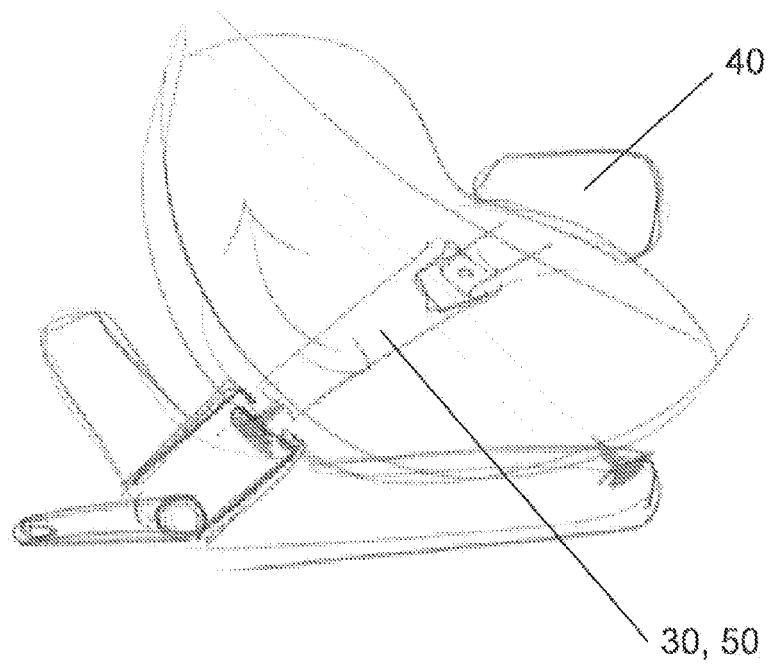

As can be seen in FIGS. 8a and 8b, it is also possible to include a less complex design which still provides a child seat 1 in direct connection to the automobile 2 via Isofix connectors 11. Whilst the above description describes the possibility of providing a rotatable child seat 1, FIG. 8 clearly shows that the advantageous aspects relating to the direct connection to the Isofix connectors 11, can still be embodied in a child seat 1 without rotational capabilities.

As is seen from FIG. 8a, the child seat 1 could be provided as a rearward facing child seat 1. That is, the Isofix connectors 11 are located toward the portion of the seat 1 which would be next to the feet of a child in the seat 1. The designs shown in FIG. 8 shows a child seat 1 which has both a base piece 10 as well as a seat portion 3. Whilst the figures show these two features to be separate or separable, it is also possible to structure the child seat 1 with the base piece 10 forming an integral part of the seat portion 3. That is, the seat portion 3 would be so structured that the lower part of the seat portion 3 could be used to rest the seat 1 on the seats of the automobile 2, with the Isofix connectors 11 being formed directly on the seat portion 3.

As is clear from the structure shown in FIG. 8a, the seat portion 3 is provided with a belt 30, 50. The belt 30, 50 is preferably a seatbelt type material, but need not be so limited. The concept of the belt 30, 50 is to provide strength to the seat portion 30 in the unfortunate incident of a crash of the automobile 2. As has been described above, the belt 30, 50 may be structured as a seatbelt loop 51 which passes around the seat portion 3. Indeed, the teachings above with regard to the second seatbelt 50 are equally applicable to the structure shown in FIG. 8a. The belt 30, 50 is intended to pass around and form a loop 51 surrounding the seat portion 3 and child therein, to reduce any longitudinal deformation of the seat portion 3 in the event of an accident.

As can be seen from the FIG. 8a, the belt 30, 50 is provided in direct connection with the base piece 10 which then provides the direct connection through the Isofix connectors 11 to the automobile 2. That is, there is direct rigid and solid connection, as is similar above for the rotatable child seat 1, between the components on the automobile 2 which interface with the Isofix connectors 11 of the child seat 1, and the belt 30, 50. The connection may arise or be fashioned by means of a rigid fashioning means provided within the seat portion 3, or as is seen in FIG. 8a, in the base piece 10. Also, the belt 30, 50 could be attached to fastening posts or mechanisms provided on the base piece 10, such that the solid connection between the belt 30, 50 and the base piece 10 is achieved.

A seat such as is shown in FIG. 8a could be provided as a detachable seat from the base piece 10. Indeed, the child seats 1 described in each of FIGS. 1 to 8 can be structured such that they could be removed from the base piece 10, so as to leave a base piece 10 which could be used for different products. As is also clear, the seat portion 3 could potentially tip, which could be achieved by providing the interaction between the seat portion 3 and the base piece 10 with a rotatable fixing mechanism, such that the belt 30, 50 is always in direct connection with the Isofix connectors 11 and no play in the connection arises. In such a situation, the belt 30, 50 will immediately transfer any stresses through the connection to the Isofix connectors 11 and connection on the automobile 2, without any pre-tensing or pre-stressing. This direct and immediate connection is useful as it means that the child seat 1 cannot move with respect to the automobile 2 in any way, and is rigidly secured by means of the Isofix connectors 11 thereto.

The designs shown in FIG. 8a, as well as all of the previous designs, are advantageous in that it is simply not possible for the user of the child seat 1 to incorrectly connect the child seat 1 to the automobile 2. The design has no external straps or belts or the like, and thus provides a child seat 1 which has only a single way of connecting to the automobile 2, which is by the Isofix connector 11. It is quite clear that the user only needs to make the required number of connections by means of the Isofix connector 11 to the automobile 2, and at this point the child seat 1 is directly and properly connected to the automobile 2. There is no necessity of providing any additional connections between the child seat 1 and the automobile 2, and thus the user is not put under any difficulties in appropriately connecting the child seat 1 to the automobile 2.

Looking at FIG. 8b, we see a second orientation of the child seat 1 seen in FIG. 8a. In this orientation, the child seat 1 is in a forward facing position, and the child thus has his face to the front of the automobile 2. It is clear in this orientation that the connection between the child seat 1 and automobile 2 will be located behind the child when sitting in the child seat 1. In this case, the Isofix connectors 11 are situated toward the back of the seat portion 3, and once again FIG. 8b shows the option of providing a base piece 10 in between the seat portion 3 and Isofix connectors 11. In the same way as described above, it will be possible to have an integral base piece 10 with the seat portion 3, such that externally it would appear that the seat portion 3 is provided with Isofix connectors 11. In the same manner as described for FIG. 8a, the child seat 1 is provided with a belt 30, 50 which is in direct connection to the isofix connectors 11, potentially with some rigid interconnection means therebetween. If the seat portion 3 is integral with the base piece 10, the belt 30, 50 could be attached directly to the Isofix connectors 11, or at least a portion of the child seat 1 next to Isofix connectors 11. In the situation shown in FIG. 8b, the belt 30, 50 is in direct connection with the interconnecting means between the seat portion 3 and the Isofix connectors 11, such that the above described rigid connection is once again provided.

In the case shown in FIG. 8b, the child seat 1 is also provided with a front or lap cushion 40. The lap cushion 40 is positioned in front of the child and will cover the lap of the child thus holding the child in the child seat 1. The lap cushion 40 is the same as that described above, and thus no further repetition will be provided.

As in the case of the rotatable child seat 1, the overriding concept is that the belt 30, 50 which interfaces with the lap cushion 40, potentially by means of the seatbelt connection 33 described above, provides a full loop around the child which is anchored to the Isofix connectors 11 directly, thus meaning that there is a direct connection holding the child into the seat 1 and to the automobile 2.

It will be appreciated that the two descriptions of the forward and rearward facing child seat 1 could be combined into a single child seat 1 which has the two orientations of forward and rearward facing. By provision of two appropriate connection means between the seat portion 3 and the Isofix connectors 11, or via the base piece 10, the child seat 1 could be a multi-positionable child seat 1. In each orientation, and indeed for the rotatable child seat described above, the underlying concept of providing the belt 30, 50 with a direct loop around the child, either in front of the child or behind the child's head, is the same, and thus means that the majority of the forces are immediately absorbed and transferred to the automobile chassis.

Numerous possible modifications of the above designs are also envisaged. For example, in the rotatable child seat 1, the rotatable element 20 is described in some way as a separate element which interfaces between the seat portion 3 and the base piece 10. Obviously, the rotatable element 20 could also be structured or incorporated as the lower portion of the seat portion 3 of the child seat 1. That is, the structure and discussion given for the rotatable element 20 could be incorporated as the lower portion of the seat portion 3, and thus appear to be a seat portion 3 without the rotatable element 20. Naturally, if the seat portion 3 can be structured out of a rigid enough material then a separate rotatable element 20 need not be included into the child seat 1.

As has been described above, when the child seat 1 is in a forward facing orientation, a lap cushion 40 is provided to hold the child in place. It is also possible to dispense with the lap cushion 40 and provide a simple belt in its place. In this case, the belt could be a belt which had an integrated airbag, such that in the event of an accident or crash the airbag inflates and essentially acts like the lap cushion 40. The use of airbags within seatbelts is becoming known, and a variety of possible triggering mechanisms could be conceived. Obviously, it is also possible to integrate an airbag into the lap cushion 40, rather than into a lap belt substituting as the lap cushion 40. Firstly, it would be possible to have the belt or lap cushion 40 within an inbuilt sensor type design, such that when the belt or cushion 40 is put under a certain amount of elongation or strain the system is triggered and the airbag is inflated. A second option would be to have a connection provided on the automobile 2 such that when the seat 1 was connected via the Isofix connectors 11, this makes a connection to the electrical signal provided from the automobile 2 indicating that the automobile 2 has had a crash. The signal which triggers the airbags commonplace at the front drivers and passenger seats, could also be used to trigger the airbag in the child seat 1. Finally, it will be possible to implement a sensor within the Isofix connection 11 of the child seat 1. If a crash occurred it is clear that the child seat 1 will be pulled or pushed in the direction of travel prior to the crash, or with the crash, and a sudden force would appear on the Isofix connection 11. If the connection is being monitored by the child seat 1, when a larger force than if save is monitored, the airbag could be triggered to inflate.

The invention claimed is:

1. A child's seat for use in an automobile comprising:
a seat portion which is engaged with a base piece, and
a rotatable element comprised of two sections of a disk element, wherein the two sections provide a concave configuration and comprise a first section and a second section separate from and spaced radially from the first section to form a space between the two sections that defines a circumferential slot defined by the first section and the second section and passing all the way around to allow for 360° rotation of the seat portion which thus allows rotation from a forward-facing position to a rearward-facing position, wherein the base piece comprises fixing elements that slidably engage in the slot such that the rotatable element interfaces in a rotatable manner with the base piece, wherein one of the base piece and seat portion is provided with at least one Isofix connector for direct attachment to at least one complementary connector component in the automobile, and the seat portion further comprises at least one belt being provided in the seat portion, being one of in direct connection with the Isofix connectors or in direct connection with the base piece during engagement of the seat portion and the base piece, and providing a direct attachment path through to the Isofix connectors, the seat portion is connected to the rotatable element, and the belt is connected to the rotatable element and configured to provide a direct attachment path through the base piece to the Isofix connectors.

2. The child's seat according to claim 1, wherein the belt is a first seat belt provided with at least one of a plurality of socket portions and a plurality of plug portions of a seat belt connector, wherein the at least one of the plurality of socket portions and the plurality of plug portions is provided at a first end and a second end of the first seat belt, wherein the first seat belt is held within the seat portion and the plurality of socket portions or plurality of plug portions are accessible to a user of the child's seat.

3. The child's seat according to claim 2, further comprising a lap cushion interfacing with the plurality of socket portions or plurality of plug portions of the first seat belt, wherein the plurality of socket portions or plurality of plug portions is located on the lap cushion such that the lap cushion will interface with the seat portion and be held in place at a location to secure a child within the child's seat, wherein the lap cushion is held in position and interfaces through the child's seat to the Isofix connectors and thus to the automobile without use of the automobile's seat belts.

4. The child's seat according to claim 1, wherein the belt is a second seat belt directly in attachment with the rotatable element and configured to provide a direct attachment path through the base piece to the Isofix connectors, wherein the second seat belt is a seat belt loop which is connected to the rotatable element at a front of the child's seat and is held within the seat portion and extends around an upper edge of the seat portion and around back of a head rest area of the seat portion, such that during an accident the head rest area of the child's seat has a direct attachment path through the base piece to the Isofix connectors, reducing any longitudinal deformations of the seat portion.

5. The child's seat according to claim 4, wherein the second seat belt is connected to a first seat belt.

6. The child's seat according to claim 1, wherein
the base piece includes a post having a large diameter top,
the rotatable element includes a bore for receiving the post, and
the rotatable element is retained on the base piece by the post, wherein
a diameter of the bore is smaller than a diameter of the large diameter top such that the large diameter top cannot pass through the bore and the post is retained within the bore.

7. The child's seat according to claim 1, wherein a first section of the disk element has a central opening which receives a shank portion of a post, wherein a diameter of the central opening is less than a diameter of a larger diameter top of the post such that the larger diameter top prevents disengagement of the rotatable element and the base piece, and wherein the circumferential slot further comprises a second opening near an edge of the disk element and located to interface with one or more sets of secondary fixing means provided on the base piece and comprising the fixing elements, wherein the one or more sets of secondary fixing means fit within the second opening and stop translational motion of the disk element with respect to the base piece but allow rotational movement of the disk element with respect to the base piece.

8. The child's seat according to claim 7, wherein the secondary fixing means are one or more posts with large diameter tops, wherein a shank of each of the one or more posts fits within the second opening of the disk element and a diameter of the large diameter top is greater than a width of the second opening such that the large diameter top prevents disengagement of the disk element from the base piece.

9. The child's seat according to claim 7, wherein the disk element includes one or more aligned slots which extend from the second opening and align with a forward orientation and a backward orientation of the seat portion, wherein the aligned slots extend inward generally toward a center of the disk element and outward generally away from the center of the disk element, wherein the aligned slots are located and sized to allow the one or more sets of secondary fixing means to slide therealong such that the seat portion can be tipped backward and forward with respect to the base piece when the aligned slots align with the one or more sets of secondary fixing means, and wherein the central opening of the disk element is a slot which allows the seat portion to be tipped backward and forward with respect to the base piece.

10. The child's seat according to claim 9, wherein the aligned slots and central slot align with the one or more sets of secondary fixing means when the seat portion is facing a front of the automobile or a rear of the automobile.

11. The child's seat according to claim 7, wherein the first section of the disk element comprises a first central disk element comprising a central opening and the second section of the disk element comprises a second toroidal element having an inner diameter which is larger than an outer diameter of the first central disk element so as to create the circumferential slot there-between.

12. The child's seat according to claim 11, wherein the first central disk element and the toroidal element of the disk element are held together by a plurality of disk attachment means, wherein the plurality of disk attachment means allow the secondary fixing means of the base piece to pass unhindered such that the disk element freely rotates.

13. The child's seat according to claim 11, wherein the disk element is a portion of a sphere surface having a curved shape, and the central disk element and the toroidal element of the disk element combine to give the disk element the curved shape of the portion of the sphere surface.

14. The child's seat according to claim 1, wherein the seat portion is integrally formed with the base piece.

15. The child's seat according to claim 14, wherein when the seat portion and base piece are integrally formed, the seat portion is provided with at least one Isofix connector for direct attachment to at least one complementary connector component in the automobile.

16. The child's seat according to claim 1, wherein the rotatable element is removably held to the base piece.

* * * * *